US012810146B2

(12) United States Patent
Ugalde Diaz et al.

(10) Patent No.: US 12,810,146 B2
(45) Date of Patent: Nov. 24, 2026

(54) SYSTEM AND METHOD FOR PROVIDING ROBUST ARTIFICIAL INTELLIGENCE INFERENCE IN EDGE COMPUTING DEVICES

(71) Applicant: Siemens Aktiengesellschaft, Munich (DE)

(72) Inventors: Ines Ugalde Diaz, Redwood City, CA (US); Heiko Claussen, Wayland, MA (US); Juan L. Aparicio Ojea, Moraga, CA (US); Martin Sehr, Kensington, CA (US); Eugen Solowjow, Berkeley, CA (US); Chengtao Wen, Redwood City, CA (US); Wei Xi Xia, Daly City, CA (US); Xiaowen Yu, Union City, CA (US); Shashank Tamaskar, Mohali (IN)

(73) Assignee: Siemens Aktiengesellschaft, Munich (DE)

( * ) Notice: Subject to any disclaimer, the term of this patent is extended or adjusted under 35 U.S.C. 154(b) by 1091 days.

(21) Appl. No.: 17/907,157

(22) PCT Filed: Mar. 30, 2020

(86) PCT No.: PCT/US2020/025719
§ 371 (c)(1),
(2) Date: Sep. 23, 2022

(87) PCT Pub. No.: WO2021/201823
PCT Pub. Date: Oct. 7, 2021

(65) Prior Publication Data
US 2023/0108920 A1 Apr. 6, 2023

(51) Int. Cl.
*G06N 3/08* (2023.01)

(52) U.S. Cl.
CPC .................................... *G06N 3/08* (2013.01)

(58) Field of Classification Search
CPC . G06F 30/00; G06N 3/08; G06N 3/00; G06N 3/045; G06N 3/09; G06N 3/091
(Continued)

(56) References Cited

U.S. PATENT DOCUMENTS

2013/0093877 A1 4/2013 Gloger
2013/0125117 A1 5/2013 Niesser et al.
(Continued)

FOREIGN PATENT DOCUMENTS

CN 109463003 A 3/2019
EP 3611578 A1 * 2/2020 ......... G05B 13/0265
WO 2020018819 A1 1/2020

OTHER PUBLICATIONS

Yoginath, Srikanth et al., "On the Effectiveness of Recurrent Neural Networks for Live Modeling of Cyber-Physical Systems", 2019, IEEE International Conference on Industrial Internet (ICII), IEEE. (Year: 2019).*

(Continued)

*Primary Examiner* — Cedric Johnson

(57) ABSTRACT

A system for supporting artificial intelligence inference in an edge computing device associated with a physical process or plant includes a neural network training module, a neural network testing module and a digital twin of the physical process or plant. The neural network training module is configured to train a neural network model for deployment to the edge computing device based on data including baseline training data and field data received from the edge computing device. The neural network testing module configured to validate the trained neural network model prior to deployment to the edge computing device by leveraging the digital twin of the physical process or plant.

11 Claims, 4 Drawing Sheets

(58) Field of Classification Search
USPC ........................................................ 703/21, 13
See application file for complete search history.

(56) References Cited

U.S. PATENT DOCUMENTS

| | | | |
|---|---|---|---|
| 2015/0199018 | A1 | 7/2015 | Kim et al. |
| 2016/0196659 | A1 | 7/2016 | Vrcelj et al. |
| 2017/0031343 | A1 | 2/2017 | Hatanaka |
| 2017/0091791 | A1 | 3/2017 | Srinivasan et al. |
| 2018/0129974 | A1 | 5/2018 | Giering et al. |
| 2018/0144214 | A1 | 5/2018 | Hsieh et al. |
| 2019/0332895 | A1 | 10/2019 | Anghel et al. |
| 2020/0019858 | A1* | 1/2020 | Han .......................... G06N 3/04 |
| 2020/0210268 | A1* | 7/2020 | Nuthi .................. G05B 23/0275 |

OTHER PUBLICATIONS

Waschneck, Bernd et al., "Deep Reinforcement Learning for Semiconductor Production Scheduling", 2018, IEEE. (Year: 2018).*
Jain, Sanjay et al., "Towards Smart Manufacturing with Virtual Factory and Data Analytics", 2017, Proceedings of the 2017 Winter Simulation Conference, IEEE. (Year: 2017).*
Yuan Weihao et al: "End-to-end nonprehensile rearrangement with deep reinforcement learning and simulation-to-reality transfer", Robotics and Autonomous Systems, ELS EV I ER BV, Amsterdam, NL, vol. 119, Jul. 4, 2019 (Jul. 4, 2019), pp. 119-134 / Jul. 4, 2019.
International Search Report corresponding to application No. PCT/US2020/025719; 5 pages.

* cited by examiner

SYSTEM AND METHOD FOR PROVIDING ROBUST ARTIFICIAL INTELLIGENCE INFERENCE IN EDGE COMPUTING DEVICES

BACKGROUND

1. Field

The present disclosure relates generally to technology for supporting artificial intelligence (AI) inference in edge computing devices. Embodiments of the present disclosure provide a system and method for robustifying AI inference in an edge computing device associated with a process or a plant by leveraging a digital twin of the process or plant.

2. Description of the Related Art

Recent advances in processor technology and AI have enabled real-time operating systems running on edge computing devices to efficiently execute prediction (also referred to as "inference") from neural network models, which reside at the core of AI. Training of neural network models takes place on sample data of the population under study. Given this, guaranteeing accuracy and performance of the neural network models after deployment is challenging. For example, in a dynamically changing production environment, the neural network models may face inputs for which they were not extensively trained and may generate inaccurate predictions.

SUMMARY

Aspects of the present disclosure are directed to a technique for robustifying artificial intelligence inference in an edge computing device associated with a process or a plant by leveraging a digital twin of the process or plant.

According to a first aspect of the present disclosure, a system is provided for supporting artificial intelligence inference in an edge computing device associated with a physical process or plant. The system comprises a neural network training module configured to train at least one neural network model for deployment to the edge computing device based on data comprising baseline training data and field data received from the edge computing device. The system further comprises a neural network testing module configured to assess a readiness of the trained neural network model prior to deployment to the edge computing device. The system further comprises a digital twin of the physical process or plant, the digital twin comprising a simulation platform configured to execute a simulation of the physical process or plant. The neural network testing module is configured to: provide a simulation input to the digital twin, the simulation input comprising one or more test scenarios involving the trained neural network model, the test scenarios being generated exploiting the field data, and validate the trained neural network model based on a simulation output obtained from the digital twin.

According to a second aspect of the present disclosure a computer-implemented method is provided for supporting artificial intelligence inference in an edge computing device associated with a physical process or plant. The method comprises training at least one neural network model for deployment to the edge computing device based on data comprising baseline training data and field data received from the edge computing device. The method further comprises assessing a readiness of the trained neural network model prior to deployment to the edge computing device by employing a digital twin of the physical process or plant. The digital twin comprises a simulation platform configured to execute a simulation of the physical process or plant. Assessing the readiness of the trained neural network model comprises: providing a simulation input to the digital twin, the simulation input comprising one or more test scenarios involving the trained neural network model, the test scenarios being generated exploiting the field data, and validating the trained neural network model based on a simulation output obtained from the digital twin.

Other aspects of the present disclosure implement features of the above-described method in computing systems and computer program products.

Additional technical features and benefits may be realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The foregoing and other aspects of the present disclosure are best understood from the following detailed description when read in connection with the accompanying drawings. To easily identify the discussion of any element or act, the most significant digit or digits in a reference number refer to the figure number in which the element or act is first introduced.

DETAILED DESCRIPTION

Neural network (NN) models deployed to edge computing devices may be trained utilizing cloud computing services. Cloud resources also enable storage of big data or execution of computationally intensive software. In industry, a digital twin provides a digital image or replica of a physical process or a plant as a means to optimize their performance. Such a digital image may also reside in the cloud. Among other aspects, a digital twin may leverage powerful simulation software to validate and optimize production properties.

In order for neural network models deployed to edge computing devices to provide high-accuracy results, it is desirable that models be re-trained regularly on newly gathered data. This is particularly pertinent in industrial settings, when most use cases require high performance accuracy. For example, in an industrial robotic application, a shift in the moving path of a robotic arm could have catastrophic consequences should it collide with critical equipment. Embodiments of the present disclosure illustrated herein provide a technique to leverage cloud resources, such as neural network training capabilities, digital twin and simulation software to robustify inference in edge computing devices.

Figure 1:
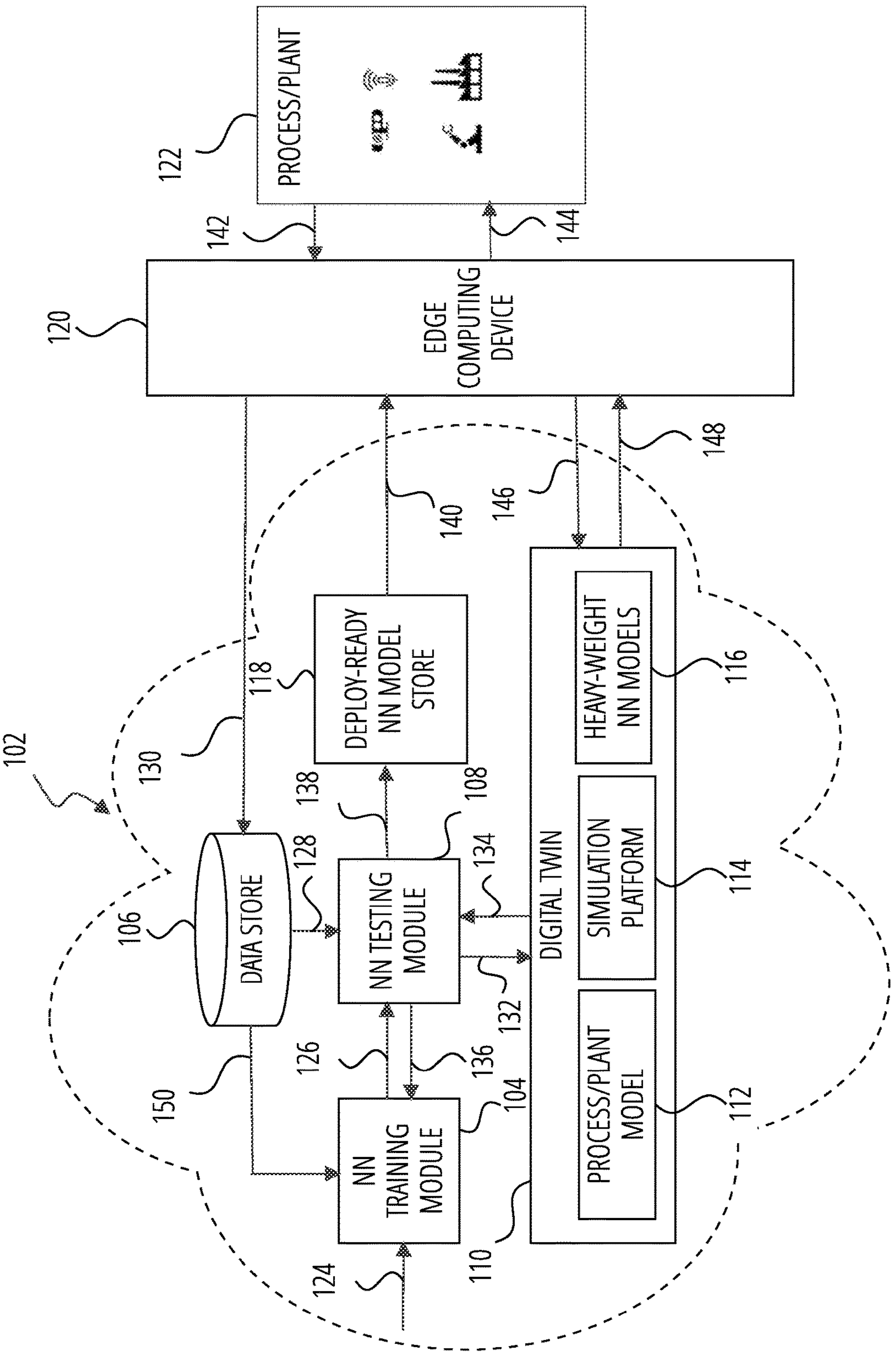
FIG. 1 is a schematic block diagram of a system for remotely supporting AI inference in an edge computing device, according an embodiment of the present disclosure.

Referring now to FIG. 1, a system 102 for supporting AI inference in an edge computing device 120 associated with a physical process or plant 122. In the shown embodiment, the system 102 is implemented in a cloud computing environment, to leverage considerable computing power, vast storage capacity and ability to run high-fidelity simulation software. In alternate embodiments, the system 102 may be implemented on a dedicated server, not necessarily residing in a cloud. The system 102 broadly comprises the following functional modules, namely: a neural network training module 104 (hereinafter, referred to as training module 104) configured for training one or more neural network models to be deployed to the edge computing device 120; a neural network testing module 108 (hereinafter, referred to as testing module 108) configured to assess the readiness of the trained neural network models obtained from the training module 104 prior to deployment to the edge computing device 120; and a digital twin 110 of the physical process or plant 122, which may be employed by the testing module 108 to validate the trained neural network models prior to deployment.

The digital twin 110 may comprise a high-fidelity model of the process or plant 122, referred to herein as process/plant model 112. The process/plant model 112 may utilize, for example, CAD models representing physical devices (referred to as field devices) of the process or plant 122. The process/plant model 112 may further include the latest sensor data associated with the respective physical devices. For example, a CAD drawing package may be used to create a digital model of the process or plant 122, and then a process control system may use the CAD model to create the process/plant model 112. That software may provide the linkage between the digital twin's sensors and controls with those in the real world. In other embodiments, instead of employing CAD models, sensor data, such as imaging data, may be utilized to generate digital representations of the field devices. The digital twin 110 may further comprise a simulation platform 114 configured to execute a simulation of the physical process or plant 122 using the process/plant model 112. The simulation platform 114 may include appropriate physics libraries for solving a physical and/or process simulation of the physical process or plant 122 based on defined constraints.

The edge computing device 120 may comprise any device with computational capability deployed close to the field devices of the physical process or plant 122. For example, the edge computing device 120 may comprise a programmable logic controller (PLC), or a computational module coupled to a PLC. The edge computing device 120 may be configured to receive sensor input 142 from sensors associated with the field devices, run an AI inference or prediction based on the sensor input 14 utilizing one or more neural network models, and generate output tasks 144, which may include commands for actuators associated with the field devices. In one embodiment, the edge computing device 120 may include a hardware accelerator (AI accelerator) designed specifically to efficiently execute the prediction or inference from Deep Neural Networks. The computational capabilities of these AI accelerators allow them to run inference (forward passes) on already trained neural network models in embedded devices. A non-limiting example of an AI accelerator suitable for the described embodiment is the SIMATIC™ TM NPU (Neural Processing Unit) manufactured by Siemens AG.

The training module 104 may use one or more neural network model skeletons 124 (i.e., neural network models prior to training) and data 150 from a data store 106 to generate one or more trained neural network models 126. The data 150 used for training may comprise baseline training data, used in an initial training of the neural network models, as well as field data 130 received from the edge computing device 120. The field data 130 may be derived from sensor data 142 associated with the field devices. The field data 130 relayed by the edge computing device 120 may comprise at least field data identified as "failure data" by the edge computing device 120. The "failure data" may include, for example, input data from the sensors that resulted in an inaccurate or low confidence output (typically a prediction or inference) from the neural network models run by the edge computing device 120. An inaccurate inference would lead to a failure of one or more field devices to implement a task generated from that inference in a satisfactory manner. In some embodiments, if the communication bandwidth permits, the field data 130 relayed by the edge computing device 120 may also comprise "success data" in addition to "failure data." Such "success data" may include, for example, input data from the sensors that resulted in a high accuracy or high confidence output from the neural network models run by the edge computing device 120. The edge computing device 120 may be configured to label the relayed field data 130 as "failure data" or "success data."

The basic training by the training module 104 may comprise, for example, data preparation (for example, including normalization, filtering and featurization, among other steps) and neural network weights computation via back propagation. Advanced or post-training techniques may be additionally employed by the training module 104, comprising, for example, data augmentation for inaccurate prediction data samples (as part of model re-training specification, described below), model pruning, regularization, among others. The trained neural network models 126 are passed on to the testing module 108.

The testing module 108 may comprise, for example, a high-fidelity sandbox capable of performing safe testing on the newly trained neural network models 126 employing the digital twin 110 of the process or plant 122. The testing module 108 may generate one or more test scenarios involving the trained neural network models 126. The test scenarios may be generated exploiting the field data 130. In one embodiment, the test scenarios may be generated with special emphasis on "failure data", i.e., input data leading to previous inaccurate inferences. Once the test scenarios are prepared, they are provided as a simulation input 132 to the digital twin 110.

Based on the simulation input 132, the digital twin 110 may execute a simulation of the physical process or plant 122 by the simulation platform 114 utilizing the most current process/plant model 112. In particular, the simulation may be executed based on constraints such as tasks/actions derived from a prediction or inference generated by the trained neural network models 126 in connection with the test scenarios. The digital twin 110 returns a simulation output 134 to the testing module 108. The simulation output 134 may comprise, for example, a performance metric associated with each trained neural network model 126. The performance metric may, for example, quantify an accuracy or confidence level of the prediction or inference generated by a trained network model 126, based on the simulation response to said prediction or inference.

Based on the simulation output 134 from the digital twin 110, the testing module 108 may determine whether the testing is satisfactory or not. For example, the testing module 108 may determine whether the performance metric in the simulation output 134 is acceptable according to a defined threshold (for example, a quantified confidence level or accuracy). If the performance metric is deemed to be unacceptable, the testing module 108 may request a re-training of a trained neural network model by the training module 104 based on a re-training specification 136. The re-training specification 136 may represent a recipe that the training module 104 will consider in the next training iteration. An example item in the recipe may be a request to perform data augmentation on certain under-performing data in the simulation input 132 to robustify the neural network model against such data. Under-performing data may include, for example, input data that leads to a failure in the output, as determined by the simulation. In this case, the re-training specification 136 may request data augmentation on the input data for which failure occurs, so as to fit more closely to the failure cases, allowing the neural network model to produce correct predictions or inferences for those cases.

The re-training of the neural network models by the training module 104 and the validation of the re-trained neural network models by the testing module 108 leveraging the digital twin 110 may be carried out in an iterative manner. The testing module 108 may assess the acceptability of a re-trained neural network model, for example, based on a performance metric as stated above, and terminate the re-training process after either a specified number of iterations have been performed or an acceptable performance metric is achieved. Once validated, the neural network models are deemed to be deployment-ready. The deployment-ready neural network models 138 may be pushed to a model store 118. The model store 118 may include a set of neural network models that have been validated and ready for deployment to the edge computing device 120. A set of neural network models 140 may be deployed from the model store 118 to the edge computing device 120. Depending on the capacity of the edge computing device 120, the set of deployed neural network models 140 may be a subset or the entire set of validated neural network models in the model store 118. The model store 118 may be periodically updated, for example, by adding newly validated neural network models and/or discarding obsolete or unused ones.

As an additional feature to support AI inference in the edge computing device 120, the system 102 may be configured to receive a high-accuracy output request 146 from the edge computing device 120 under certain circumstances, such as band-width in time tolerance, or low-confidence output from a deployed neural network model, among others. In such a case, the system 102 may use the digital twin 110 to return a high-accuracy inference 148 to the edge computing device 120. To that end, the digital twin 110 may comprise undeployed neural network models 116 that are potentially more heavy-weight (i.e., computationally intensive) than those deployed to the edge computing device 120. The heavy-weight neural network models 116 may be used to generate high-accuracy inferences, that may be tested using the simulation capabilities of the digital twin 110 before being returned to the edge computing device 120.

Figure 2:
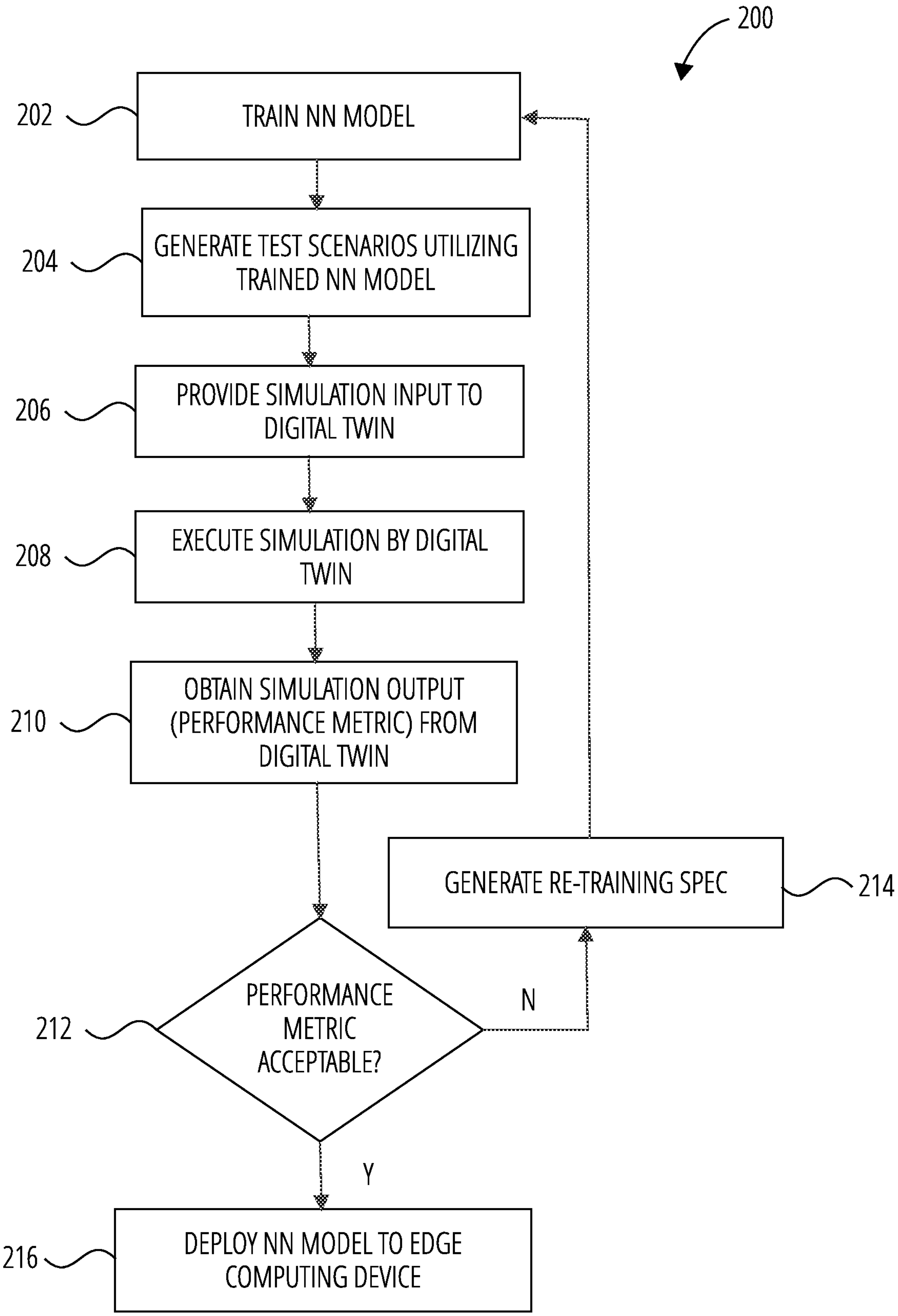
FIG. 2 illustrates an example of a computer-implemented routine for validating a trained neural network model for deployment to an edge computing device.

FIG. 2 is a flowchart illustrating a method 200 for validating a trained neural network model for deployment to an edge computing device associated with a physical process or plant. The method 200 may comprise a computer-implemented routine. The method 200 may be embodied as part of a maintenance service for edge computing devices associated with a physical process or a plant, for example, implemented in a cloud computing environment. As part of a maintenance service, the method 200 may be executed periodically, with a specified frequency, or may be executes in an event-based manner, for example, triggered by a factory operator. The flowchart of FIG. 2 is not intended to indicate that the blocks of the method 200 are to be executed in any particular order, or that all of the blocks of the method 200 are to be included in every case. Additionally, the method 200 can include any suitable number of additional operations.

Block 202 of the method 200 involves training a neural network model. The training may be implemented using data that includes both baseline training data and field data received from the edge computing device. The field data used in the training may comprise at least field data that is identified as "failure data" by the edge computing device. The method 200 then involves assessing a readiness of the trained neural network model to be deployed to the edge computing device, employing a digital twin of the physical process or plant. The digital twin may comprise a simulation platform to execute a simulation of the physical process or plant.

Block 204 of the method 200 involves generating one or more test scenarios involving the trained neural network model. The test scenarios may be generated exploiting the field data, and in some embodiments with special emphasis on "failure data", i.e., input data leading to previous inaccurate inferences.

At block 206, the test scenarios are sent as simulation input to the digital twin.

Block 208 of the method 200 involves executing a simulation of the physical process or plant by the digital twin. This may involve executing a simulation of the physical process or plant based on an inference generated by the trained neural network model in connection with the one or more test scenarios.

Block 210 of the method 200 involves obtaining a simulation output from the digital twin. The simulation output 134 may comprise, for example, a performance metric associated with the trained neural network model.

Block 212 of the method 200 involves a decision as to whether the performance metric is acceptable. The decision may be implemented, for example, according to a defined threshold.

If the performance metric is deemed unacceptable at block 212, the control proceeds to block 214, which involves generating a re-training specification. The control then returns to block 202, which involves re-training the neural network model based on the re-training specification.

The re-training process is carried out in an iterative loop, until it is determined, at block 212, that the re-trained neural network model produces an acceptable performance metric. Alternately, the re-training loop may be terminated after a specified number of iterations. The neural network model is now validated.

Block 216 of the method 200 involves deploying the validated neural network model to the edge computing device.

Figure 3:
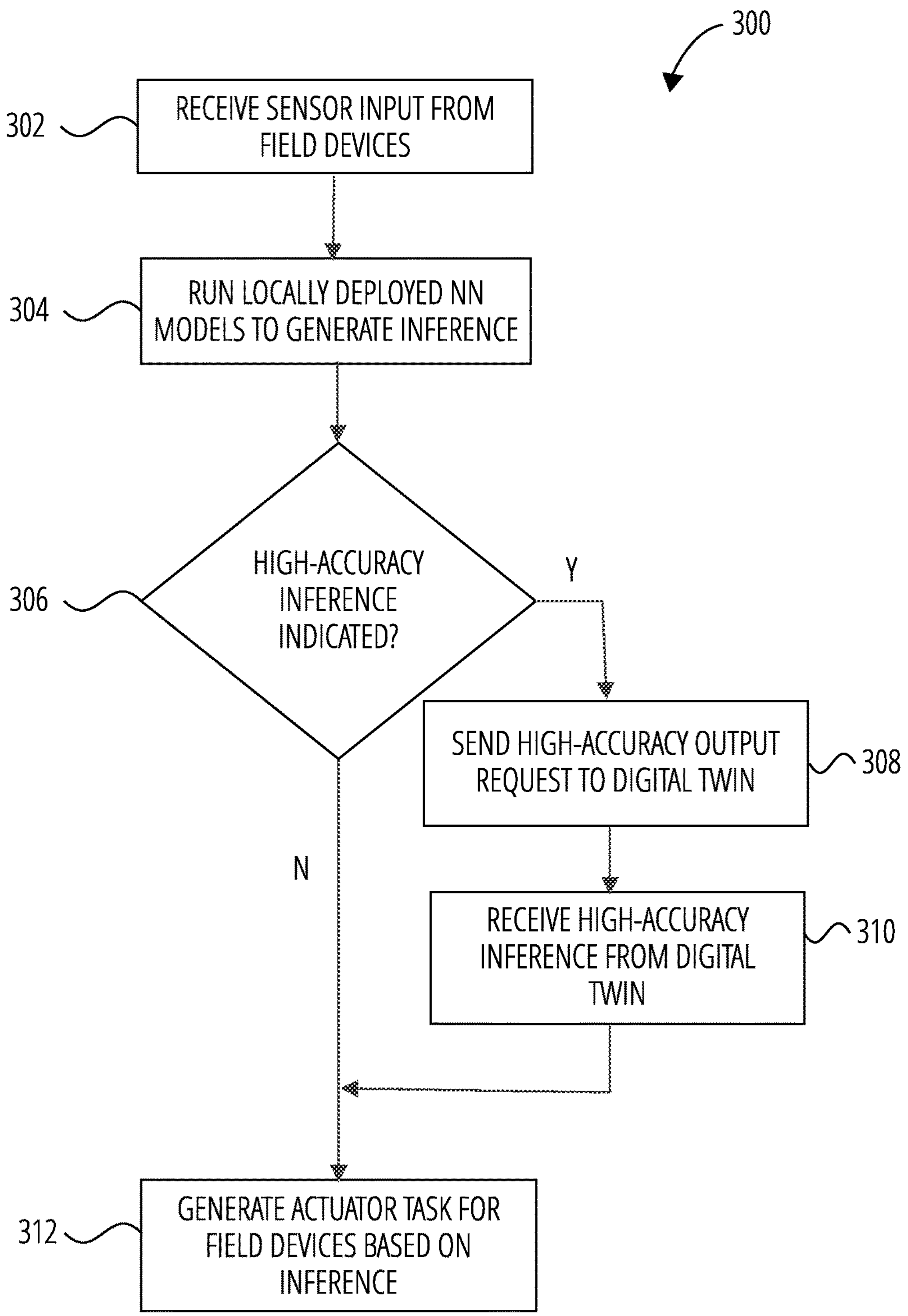
FIG. 3 illustrates an example routine implemented by an intelligent edge computing device.

FIG. 3 is an example of a routine or method 300 which may be implemented by an intelligent edge computing device associated with a physical process or plant. The flowchart of FIG. 3 is not intended to indicate that the blocks of the method 300 are to be executed in any particular order, or that all of the blocks of the method 300 are to be included in every case. Additionally, the method 300 can include any suitable number of additional operations.

Block 302 of the method 300 involves receiving input data from field devices of the process or plant. The input data may be gathered from sensors connected to the field devices and prepared in the edge computing device, for example, utilizing vision and/or signal processing techniques.

Block 304 of the method 300 involves generating a prediction or inference from the input data by running one or more neural network models deployed to the edge computing device.

Block 306 of the method 300 involves evaluating the quality of the inference or prediction provided by the locally deployed neural network models before providing prediction or inference to the output interface of the edge computing device. In particular, block 306 involves a decision as to whether a high-accuracy inference is indicated. A high-accuracy inference may be indicated in one or more of the following non-limiting example scenarios, namely: (1) the next action output can tolerate the added latency of a cloud request, (2) the output of the edge computing device's neural network models has confidence below a specified threshold, and (3) the edge computing device has tried to succeed on the same input data a number of consecutive times and requires a high-quality solution to exit the loop.

If it is determined at block 306 that a high-accuracy inference is not indicated, the control proceeds to block 312. If it is determined at block 306 that a high-accuracy inference is indicated, the control proceeds to block 308 which involves sending a high-accuracy output request to a digital twin of the physical process or plant. The digital twin may reside in a cloud computing environment. When a high-accuracy output request is received in the cloud, the digital twin may employ its current model of the process or plant, high-accuracy simulation tools and potentially heavy-weight neural network models to calculate and test an inference. Block 310 of the method 300 involves receiving a high-accuracy inference from the digital twin.

Block 312 of the method 300 involves translating the prediction or inference into output tasks, which may include commands for actuators associated with the field devices.

Figure 4:
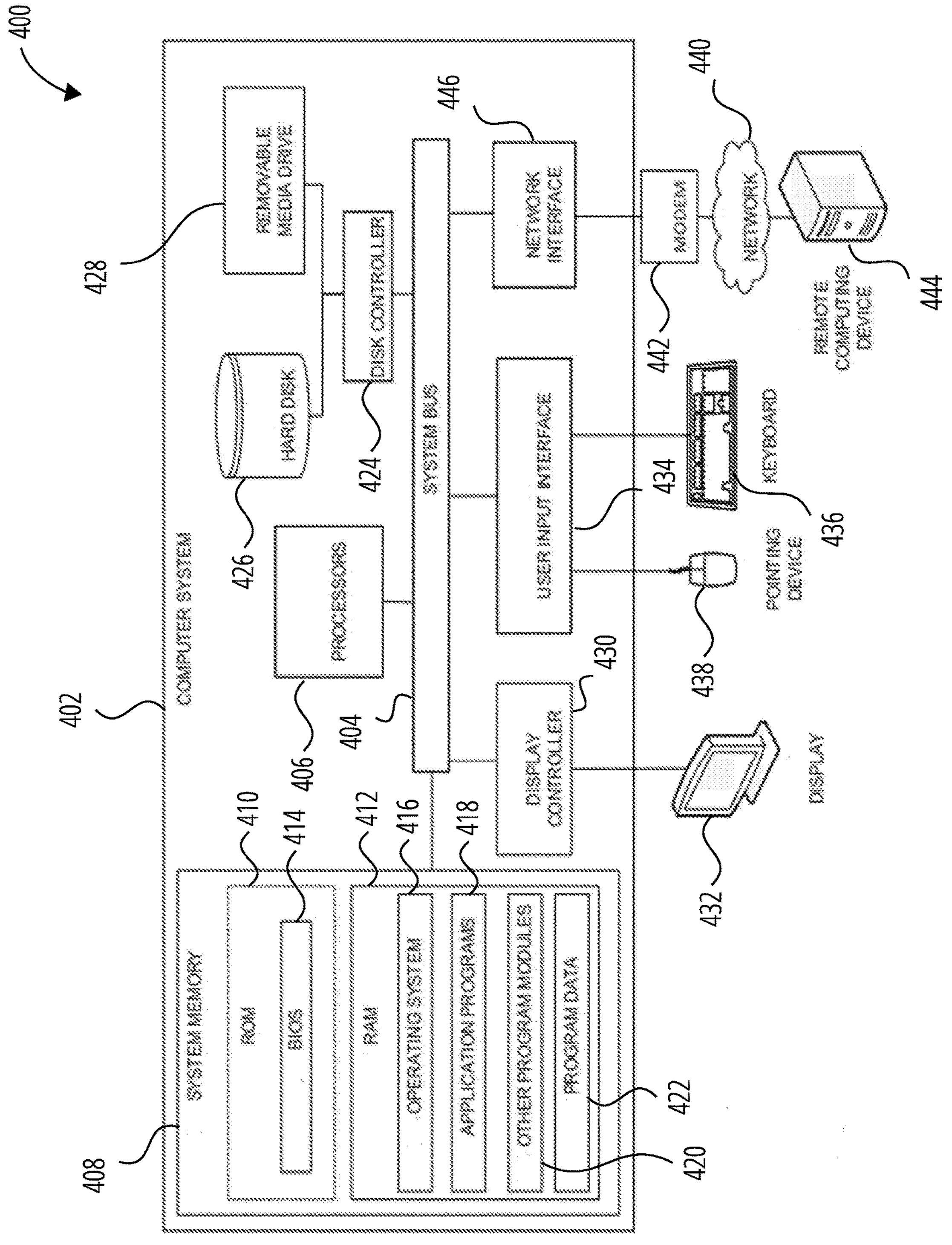
FIG. 4 illustrates an exemplary computing environment within which embodiments of the disclosure may be implemented.

FIG. 4 illustrates an exemplary computing environment 400 within which embodiments of the disclosure may be implemented. Computers and computing environments, such as computer system 402 and computing environment 400, are known to those of skill in the art and thus are described briefly here. It should be noted that where embodiments of the present disclosure implemented in a cloud computing environment, some of the items included in the exemplary computing environment 400 (e.g., keyboard 436) may not be applicable.

As shown in FIG. 4, the computer system 402 may include a communication mechanism such as a system bus 404 or other communication mechanism for communicating information within the computer system 402. The computer system 402 further includes one or more processors 406 coupled with the system bus 404 for processing the information. The processors 406 may include one or more central processing units (CPUs), graphical processing units (GPUs), or any other processor known in the art.

The computer system 402 also includes a system memory 408 coupled to the system bus 404 for storing information and instructions to be executed by processors 406. The system memory 408 may include computer readable storage media in the form of volatile and/or nonvolatile memory, such as read only memory (ROM) 910 and/or random access memory (RAM) 912. The system memory RAM 412 may include other dynamic storage device(s) (e.g., dynamic RAM, static RAM, and synchronous DRAM). The system memory ROM 410 may include other static storage device (s) (e.g., programmable ROM, erasable PROM, and electrically erasable PROM). In addition, the system memory 408 may be used for storing temporary variables or other intermediate information during the execution of instructions by the processors 406. A basic input/output system 414 (BIOS) containing the basic routines that help to transfer information between elements within computer system 402, such as during start-up, may be stored in system memory ROM 410. System memory RAM 412 may contain data and/or program modules that are immediately accessible to and/or presently being operated on by the processors 406. System memory 408 may additionally include, for example, operating system 416, application programs 418, other program modules 420 and program data 422.

The computer system 402 also includes a disk controller 424 coupled to the system bus 404 to control one or more storage devices for storing information and instructions, such as a magnetic hard disk 426 and a removable media drive 428 (e.g., floppy disk drive, compact disc drive, tape drive, and/or solid state drive). The storage devices may be added to the computer system 402 using an appropriate device interface (e.g., a small computer system interface (SCSI), integrated device electronics (IDE), Universal Serial Bus (USB), or FireWire).

The computer system 402 may also include a display controller 430 coupled to the system bus 404 to control a display 432, such as a cathode ray tube (CRT) or liquid crystal display (LCD), among other, for displaying information to a computer user. The computer system 402 includes a user input interface 434 and one or more input devices, such as a keyboard 436 and a pointing device 438, for interacting with a computer user and providing information to the one or more processors 406. The pointing device 438, for example, may be a mouse, a light pen, a trackball, or a pointing stick for communicating direction information and command selections to the one or more processors 406 and for controlling cursor movement on the display 432. The display 432 may provide a touch screen interface which allows input to supplement or replace the communication of direction information and command selections by the pointing device 438.

The computer system 402 may perform a portion or all of the processing steps of embodiments of the disclosure in response to the one or more processors 406 executing one or more sequences of one or more instructions contained in a memory, such as the system memory 408. Such instructions may be read into the system memory 408 from another computer readable medium, such as a magnetic hard disk 426 or a removable media drive 428. The magnetic hard disk 426 may contain one or more datastores and data files used by embodiments of the present disclosure. Datastore contents and data files may be encrypted to improve security. The processors 406 may also be employed in a multiprocessing arrangement to execute the one or more sequences of instructions contained in system memory 408. In alternative embodiments, hard-wired circuitry may be used in place of or in combination with software instructions. Thus, embodiments are not limited to any specific combination of hardware circuitry and software.

The computer system 402 may include at least one computer readable medium or memory for holding instructions programmed according to embodiments of the disclosure and for containing data structures, tables, records, or other data described herein. The term "computer readable medium" as used herein refers to any medium that participates in providing instructions to the one or more processors 406 for execution. A computer readable medium may take many forms including, but not limited to, non-transitory, non-volatile media, volatile media, and transmission media.

Non-limiting examples of non-volatile media include optical disks, solid state drives, magnetic disks, and magneto-optical disks, such as magnetic hard disk 426 or removable media drive 428. Non-limiting examples of volatile media include dynamic memory, such as system memory 408. Non-limiting examples of transmission media include coaxial cables, copper wire, and fiber optics, including the wires that make up the system bus 404. Transmission media may also take the form of acoustic or light waves, such as those generated during radio wave and infrared data communications.

The computing environment 400 may further include the computer system 402 operating in a networked environment using logical connections to one or more remote computers, such as remote computing device 444. Remote computing device 444 may be a personal computer (laptop or desktop), a mobile device, a server, a router, a network PC, a peer device or other common network node, and typically includes many or all of the elements described above relative to computer system 402. When used in a networking environment, computer system 402 may include a modem 442 for establishing communications over a network 440, such as the Internet. Modem 442 may be connected to system bus 404 via network interface 446, or via another appropriate mechanism.

Network 440 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 402 and other computers (e.g., remote computing device 444). The network 440 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 440.

The embodiments of the present disclosure may be implemented with any combination of hardware and software. In addition, the embodiments of the present disclosure may be included in an article of manufacture (e.g., one or more computer program products) having, for example, computer-readable, non-transitory media. The media has embodied therein, for instance, computer readable program code for providing and facilitating the mechanisms of the embodiments of the present disclosure. The article of manufacture can be included as part of a computer system or sold separately.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The functions and process steps herein may be performed automatically, wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the disclosure to accomplish the same objectives. Although this disclosure has been described with reference to particular embodiments, it is to be understood that the embodiments and variations shown and described herein are for illustration purposes only. Modifications to the current design may be implemented by those skilled in the art, without departing from the scope of the disclosure.

What is claimed is:

1. A computer-implemented method for supporting artificial intelligence inference in an edge computing device associated with a physical process or plant, the method comprising:

training at least one neural network model for deployment to the edge computing device based on data comprising baseline training data and field data received from the edge computing device; and assessing a readiness of the trained neural network model prior to deployment to the edge computing device by employing a digital twin of the physical process or plant, the digital twin comprising a simulation platform configured to execute a simulation of the physical process or plant, wherein assessing the readiness of the trained neural network model comprises:

providing a simulation input to the digital twin, the simulation input comprising one or more test scenarios involving the trained neural network model, the test scenarios being generated exploiting the field data, and validating the trained neural network model based on a simulation output obtained from the digital twin.

2. The method of claim 1, wherein the field data received from the edge computing device comprises at least field data identified as failure data by the edge computing device.

3. The method of claim 2, comprising generating the test scenarios using the failure data.

4. The method of claim 1, comprising generating the simulation output by the digital twin by executing a simulation of the physical process or plant based on an inference generated by the trained neural network model in connection with the one or more test scenarios.

5. The method of claim 1, wherein the simulation output from the digital twin comprises a performance metric of the trained neural network model, and wherein the method comprises validating trained neural network model by determining whether the performance metric is acceptable according to a defined threshold.

6. The method of claim 5, comprising:

in the event that the performance metric is not acceptable, re-training the neural network model based on a re-training specification.

7. The method of claim 6, wherein the re-training specification comprises a request to perform data augmentation on under-performing data in the simulation input.

8. The method of claim 6, comprising iteratively re-training the neural network model and validating the re-trained neural network model prior to deployment to the edge computing device, until:

a specified number of iterations is performed, or an acceptable performance metric is achieved.

9. The method of claim 1, comprising:

providing a high-accuracy inference to the edge computing device by the digital twin, responsive to a request from the edge computing device, the high-accuracy inference being generated utilizing one or more undeployed neural network models in conjunction with a simulation of the physical process or plant by the digital twin.

10. A non-transitory computer-readable storage medium, the computer-readable storage medium including instructions that when executed by a computer, cause the computer to:

train at least one neural network model for deployment to the edge computing device associated with a physical process or plant based on data comprising baseline training data and field data received from the edge computing device; and assess a readiness of the trained neural network model prior to deployment to the edge computing device by employing a digital twin of the physical process or plant, the digital twin comprising a simulation platform configured to execute a simulation of the physical process or plant, wherein assessing the readiness of the trained neural network model comprises:

providing a simulation input to the digital twin, the simulation input comprising one or more test scenarios involving the trained neural network model, the test scenarios being generated exploiting the field data, and validating the trained neural network model based on a simulation output obtained from the digital twin.

11. A system for supporting artificial intelligence inference in an edge computing device associated with a physical process or plant, the system comprising:

one or more processors, and non-transitory memory including instructions executable by the one or processors to:

train at least one neural network model for deployment to the edge computing device based on data comprising baseline training data and field data received from the edge computing device; and assess a readiness of the trained neural network model prior to deployment to the edge computing device by employing a digital twin of the physical process or plant, the digital twin comprising a simulation platform configured to execute a simulation of the physical process or plant, wherein assessing the readiness of the trained neural network model comprises:

provide a simulation input to the digital twin, the simulation input comprising one or more test scenarios involving the trained neural network model, the test scenarios being generated exploiting the field data, and validate the trained neural network model based on a simulation output obtained from the digital twin.

* * * * *